United States Patent [19]

Weaver

[11] 4,167,076
[45] Sep. 11, 1979

[54] WORM HEAD FISHING LURE

[76] Inventor: Charles S. Weaver, 6704 E. 60th Pl., Tulsa, Okla. 74145

[21] Appl. No.: 834,223

[22] Filed: Sep. 19, 1977

[51] Int. Cl.² ............................................. A01K 85/00
[52] U.S. Cl. .................................. 43/42.2; 43/42.24; 43/42.29; 43/42.36
[58] Field of Search ................. 43/42.24, 42.26, 42.27, 43/42.28, 42.29, 42.19, 42.2, 42.36, 42.39, 42.09

[56] References Cited

U.S. PATENT DOCUMENTS

| | | | |
|---|---|---|---|
| 3,108,390 | 10/1963 | Knight | 43/42.36 X |
| 3,120,074 | 2/1964 | Messler | 43/42.28 |
| 3,148,474 | 9/1964 | Smith | 43/42.36 X |
| 3,863,378 | 2/1975 | Walker | 43/42.28 |
| 3,909,974 | 10/1975 | Kent | 43/42.39 X |
| 3,971,152 | 7/1976 | Husson | 43/42.28 X |

OTHER PUBLICATIONS

Burke Chain Worm, Sporting Goods Dealer, Feb. 1968, p. 19.

Primary Examiner—Nicholas P. Godici

[57] ABSTRACT

A fishing lure which comprises, in combination, a flexible, molded plastic, imitation worm of synthetic resin, or other suitable material, and a head structure, comprising a weighted head and a tubular stem, of selected length and diameter, inserted axially through the head. The stem is inserted axially into the leading end of the worm, such that the end will break out through the surface of the worm when the leading end of the worm is positioned against the head. A fishing line is inserted from the front end of the head through the central opening of the stem, out through the end of the stem and attached to the eye of a fish hook. The barbed end of the hook is passed through the body of the worm, so that the shank would lie along the surface of the worm. Various additions of moving parts, vanes, and painted surfaces can be added to the head, of the head assembly.

4 Claims, 8 Drawing Figures

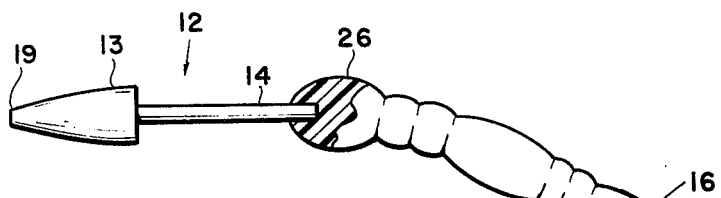
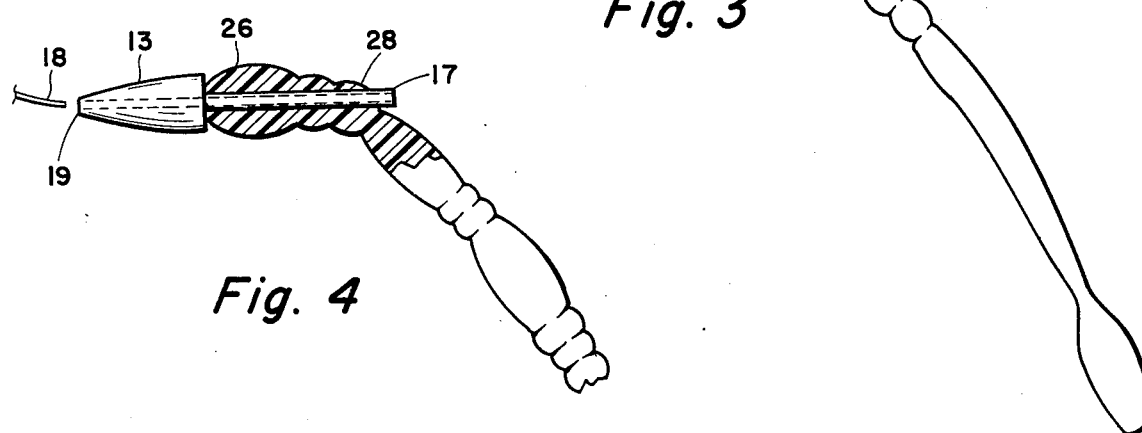
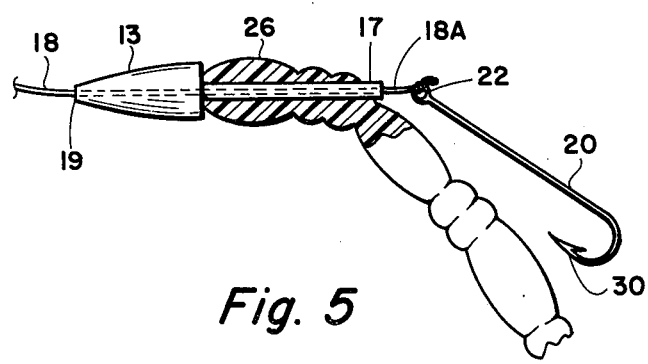
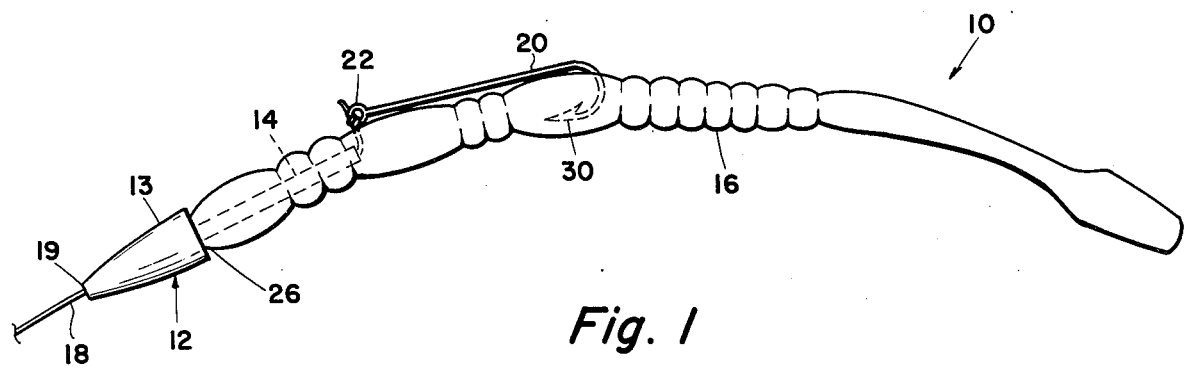

WORM HEAD FISHING LURE

BACKGROUND OF THE INVENTION

1. Field of the Invention

This invention lies in the field of lures for fishermen. More particularly, it concerns a type of lure that has a strong mechancial structure and has the appearance of a worm which is moving through the water in an axial direction.

2. Description of the Prior Art

In the prior art there are many examples of lures, with heads and with various appendages attached flexibly to the head, including fish hooks, etc. In this head assembly means are provided for attaching a head to a plastic worm such that the head and worm are fixed rigidly together. Also, an opening is provided through the head and part-way through the worm for the passage of a fishing line, to which a hook can be attached. In the prior art the heads and bodies of the worm were variously flexibly attached, which provided a weak mechanical structure and gave a marked lack of resemblance to a natural worm. This condition is improved upon, in this invention, by rigidly attaching the head structure to the worm.

SUMMARY OF THE INVENTION

It is a primary object of this invention to provide a head structure, which includes a head, to simulate the head of a worm, or a fish, and a long plastic flexible structure to simulate a worm. The two parts are held by an elongated tubular stem which is part of the head and extends backward from the head a selected distance. The worm is attached to the head by piercing the worm axially at the leading end by means of the stem. When the leading portion of the worm is tight against the head, the back end of the stem is broken out through the surface of the worm, so that a clear passage is provided from the front of the head, through the internal bore of the tubular stem. A fishing line is inserted through the bore of the stem, from the front of the head, out through the back of the stem, which is at the surface of the worm. A fish hook is attached to the end of the line which is then pulled out of the head so as to bring the knot and the eye of the shank of the hook, adjacent the end of the stem. The hook, if desired, can then be passed through the body of the worm so that the shank lies parallel to, and along, the surface of the worm.

BRIEF DESCRIPTION OF THE DRAWINGS

These and other objects and advantages of this invention and a better understanding of the principles and details of the invention will be evident from the following description taken in conjunction with the appended drawing in which:

FIG. 1 illustrates a complete assembly of the head assembly of this invention, in conjunction with a plastic worm, assembled ready for use on the end of a fishing line.

FIGS. 3, 4 and 5 illustrate the steps in assembly of the head assembly of the worm.

DESCRIPTION OF THE PREFERRED EMBODIMENT

Figure 2:
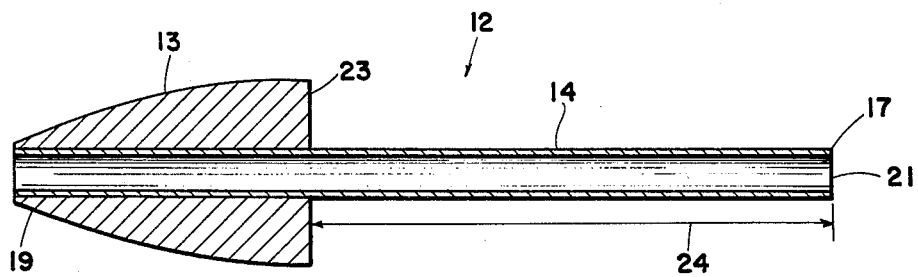
FIG. 2 illustrates the construction of the head assembly.

Referring now to the drawings and, in particular, to FIG. 1, there is shown one embodiment of this invention indicated generally by the numeral 10. It comprises a head assembly indicated generally by the numeral 12, containing a head assembly generally indicated by the numeral 12, containing a head 13, and a tubular stem 14, which will be fully described in conjunction with FIG. 2. The stem 14 is inserted axially through the front end 26 of the worm 16. When the front end 26 of the worm is pressed against the back end of the head 13, the end 17 is broken out through the surface of the worm.

A clear passage is, therefore, provided through the bore of the tubular stem from the front end 19 of the head 13 through the stem, to its terminal end 17.

A fishing line 18 is inserted through this opening from the front end 19 and is presented as 18A, issuing out of the end 17 of the stem. This end of the fishing line 18A is then tied conventionally to the eye 22 of the fish hook 20. The line 18 is then pulled forward until the knot and the eye 22 are tight against the end of the stem 17. The hook can be left in that position, or preferably, it is inserted into the body of the worm such that the barbed point 30 is inside the worm as shown in FIG. 1.

In this way the worm is securely attached to the head 12 by the friction of the plastic of the worm on the outer surface of the stem 14. It is also locked in position by the knot and the eye of the hook, preventing the movement of the worm off of the stem. Thus, the assembly as shown in FIG. 1 presents a slim flexible contour which is coaxial with the line 18 and appears to move through the water head first.

Figure 6:
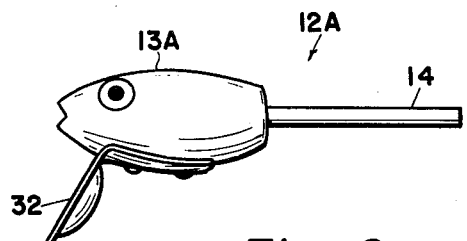
FIGS. 6, 7 and 8 illustrate variations in the shape of, and appendages of, the head assembly.
Figure 7:
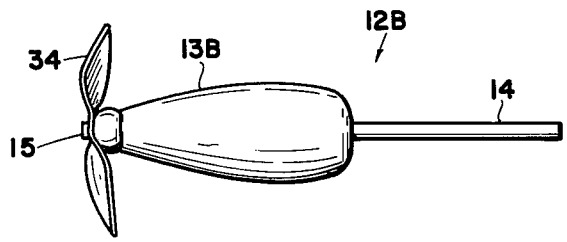
Figure 8:
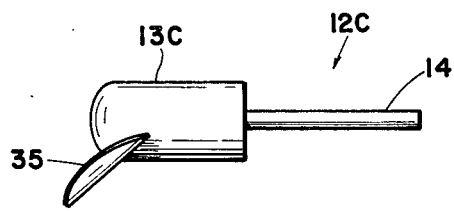

Referring now to FIG. 2, there is shown in detail one construction of the head assembly 12 of this invention. It comprises a head 13, generally of circular symmetry, which may be more or less cylindrical as shown in FIG. 8, with rounded front end or it may be of a tapered construction such as shown in FIGS. 2, 6 and 7, for example. Generally, the material of the head can be of metal or plastic, such that the density of the head assembly will be great enough to cause the overall assembly of FIG. 1 to sink in the water.

The stem 14 is a small tubular pipe of metal or plastic, which has a central bore 21 and is inserted into a corresponding bore in the head 13, such that the stem goes completely through the head, and may even extend beyond the front end 19 of the head. An example is shown in FIG. 7 where the extended end 15 of the stem 14 serves as a shaft about which a small metal propeller 34 can rotate. In most cases, however, the front end 15 of the stem 14 will be flush with the front end 19 of the head. The length 24 of the extended portion of the stem, between the back 23 of the head and the end 17 of the stem is of selected length, sufficient for the purpose of attaching any one of a number of different bodies to the head assembly.

Referring now to FIGS. 3, 4 and 5, there are shown steps in the assembly of the head assembly 12, to a worm 16, of the conventional flexible plastic molded type, which have been used and are well known in fishing. The head assembly 12 is held while the leading end 26 of the worm is pressed over the end of the stem 14. The insertion of the stem is more or less axial, for a distance back from the front end of the worm substantially equal to the exposed length 24 of the stem. At that point the worm is bent slightly so that the end 17 of the stem can penetrate the surface 28 of the worm. Thus, there is a clear central passage from the front end 19 of the head 13, to the back end 17 of the stem 14. The end of a fishing line 18 is inserted from the front 19 of the head, into this opening, and out through the end 17 of the stem. The exposed end 18A of the fishing line is then tied in a conventional manner to the eye 22 of the fish hook 20. The line 18 is then pulled forward until the exposed end 18A and the knotted portion of the line and the eye are tight against the end 17 of the stem.

As mentioned previously, the head assembly 12 is preferably made sufficiently heavy, so that the combination of the head assembly, the worm, and the fish hook will sink in the water, and will trail, at depth in the water, when the line 18 is moved forward.

The lure may be used in this way with a hook simply attached at the eye, or the hook can be positioned as shown in FIG. 1, in which the barbed point 30 is pressed into the body of the worm and the shank of the hook lies substantially parallel along the side of the worm.

Referring now to FIGS. 6, 7 and 8, there are shown several other embodiments in which the tapering head 13 of FIG. 2 is modified in shape and, by the addition of bright metal attachments, such as the dish 32 of FIG. 6, and the vane 35 of FIG. 8, and the rotating member 34, of bright metal of FIG. 7. Many other attachments can be made if desired. Also, the shape of the head can be varied to include that of the head of a small fish as in 13A of FIG. 6, or a long tapered head 13B of FIG. 7 or a cylindrical head 13C of FIG. 8.

What has been described is a special type of lure which includes a head assembly of novel design which can be used in conjunction with a conventional plastic worm to provide a unique type of lure which simulates a live worm in the manner in which it moves through the water.

Also described is a head assembly that can be used with other selected types of bodies, other than that of a worm, to provide distinctive lures that flow through the water in the manner of fishes, eels, etc.

While the invention has been described with a certain degree of particularity, it is manifest that many changes may be made in the details of the construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A head assembly and flexible plastic molded imitation worm attachable to the end of a fishing line, the combination comprising;
    (a) said head, of short length and of a stream-lined shape at its front end;
    (b) a tubular stem of selected length and diameter smaller than said head and fixed axially from said front end of said head to a selected distance beyond a back end of said head;
    (c) a front end of said worm positioned upon said selected distance of said stem;
    (d) said fishing line extending through said stem and said worm to a hook attachable to the end of said fishing line, whereby the point of said hook is insertable at any position in a back end of said worm.

2. The assembly in claim 1 including a propeller rotatably mounted to the front end of said head.

3. The assembly as in claim 1 including at least one vane attached to said head to cause a selected motion of said lure, as it is drawn through the water.

4. The assembly as in claim 1 in which said head is painted to look like the head of a small fish.

* * * * *